(12) United States Patent
Sharma et al.

(10) Patent No.: US 9,146,547 B2
(45) Date of Patent: Sep. 29, 2015

(54) OPTIMAL ENERGY MANAGEMENT OF A RURAL MICROGRID SYSTEM USING MULTI-OBJECTIVE OPTIMIZATION

(75) Inventors: Ratnesh Sharma, Fremont, CA (US); Xianjun Zhang, Tempe, AZ (US)

(73) Assignee: NEC Laboratories America, Inc., Princeton, NJ (US)

( * ) Notice: Subject to any disclaimer, the term of this patent is extended or adjusted under 35 U.S.C. 154(b) by 566 days.

(21) Appl. No.: 13/543,820

(22) Filed: Jul. 7, 2012

(65) Prior Publication Data
US 2013/0024014 A1 Jan. 24, 2013

Related U.S. Application Data

(60) Provisional application No. 61/509,642, filed on Jul. 20, 2011.

(51) Int. Cl.
G05D 3/12 (2006.01)
G05D 5/00 (2006.01)
G05D 9/00 (2006.01)
G05D 11/00 (2006.01)
G05D 17/00 (2006.01)
G05D 23/00 (2006.01)
G05B 13/04 (2006.01)
G05B 17/02 (2006.01)

(52) U.S. Cl.
CPC .............. G05B 13/04 (2013.01); G05B 17/02 (2013.01)

(58) Field of Classification Search
CPC ........................................................ G05B 13/04
USPC ........................... 700/29, 286, 287, 291, 300
See application file for complete search history.

(56) References Cited

U.S. PATENT DOCUMENTS

| | | | |
|---|---|---|---|
| 2004/0267408 A1* | 12/2004 | Kramer | 700/291 |
| 2008/0094797 A1* | 4/2008 | Coglitore et al. | 361/687 |
| 2008/0303348 A1* | 12/2008 | Witters | 307/72 |
| 2011/0066258 A1* | 3/2011 | Torzhkov et al. | 700/29 |
| 2012/0041610 A1* | 2/2012 | Varigonda et al. | 700/288 |

OTHER PUBLICATIONS

Modeling of internal combustion engine based cogeneration systems for residential applications by Onovwiona et al. Nov. 2006.*
Battery capacity mesurment and analysis using lithium coin cell battery by Park et al. Aug. 2001.*
The prospects for expanded utilization of biogas systems in German by Poeschl et al. Mar. 2010.*

* cited by examiner

*Primary Examiner* — Mohammad Ali
*Assistant Examiner* — Ziaul Karim
(74) *Attorney, Agent, or Firm* — Joseph Kolodka

(57) ABSTRACT

Systems and methods are disclosed to improve energy efficiency of a farm with livestock wastes by generating a cooling, heating, and power (CCHP) microgrid model; performing on a computer a multi-objective optimization to improve system efficiency of energy utilization and reduce environmental problems caused by animal wastes; and displaying results of the optimization for review.

17 Claims, 3 Drawing Sheets

OPTIMAL ENERGY MANAGEMENT OF A RURAL MICROGRID SYSTEM USING MULTI-OBJECTIVE OPTIMIZATION

The present application claims priority to Provisional Application Ser. No. 61/509,642 filed Jul. 20, 2011, the content of which is incorporated by reference.

BACKGROUND

Energy management of a resilient and sustainable power infrastructure for a remote area is challenging. For example, environmental and economic considerations make it less feasible today for the construction of long distance transmission lines to remote areas with few as well as sparse population, which will drive up the cost of electricity supply and delivery. Large livestock farms or dairy farms are usually located far away from urban areas and sometimes the electricity supply can be a problem. Additionally, these farms may cause environmental problems brought by the inappropriate treatment of animal waste in these farms. The aggregated piled up animal waste seriously deteriorates the surrounding environment, especially for the air condition. The foul odor sometimes can be smelled miles away along the freeway, where a dairy farm is usually located nearby. Anaerobic digestion is an effective way of dealing with animal waste in these farms, which can protect the environment by consuming animal waste and the produced biogas energy is renewable.

An emerging technical solution to counter the above mentioned problems is the microgrid, which is a regional electric power distribution network consisting of DERs and local loads. Microgrid can:

improve the utility system performance through combined heat and power (CHP), and increasing of the overall transmission utilization,
provide back-up power and premium power,
make use of renewable energy such as biogas, PV and wind, and
reduce greenhouse gas emissions.

Management and operation of microgrid is complex and many issues should be considered. The basic microgrid architecture may consist of a collection of distributed generation, storage and load assets connected through a system of feeders controlled as a single entity. These entities can be connected to the grid or isolated from the grid based on IEEE 1547 or other applicable standards. Selection and sizing of distributed generation assets (DER) is based on operational characteristics, efficiency, initial cost, and onsite conditions. When a microgrid operates in grid connected mode, the local load receives real/reactive power either from the grid or from local DERs or from both, depending on the customer's situation; when the microgrid switches to stand-alone operation, the power supply, and the load should be the same to clear the power mismatch condition and regulate voltage magnitude and frequency of the islanded system. Microturbines and fuel cells are inertia-less and the response time to control signal is relatively slow; thus, the storage, like batteries or supercapacitors, should be necessarily considered to ensure initial energy balance. Management of grid-tied and islanded system should consider the cost of startup/shutdown and efficiency curves of all generation and storage systems in addition to normal maintenance and fuel costs. Energy arbitrage is another consideration depending on the power purchase agreement between the utility and the microgrid operator.

SUMMARY

Systems and methods are disclosed to improve energy efficiency of a farm with livestock wastes by generating a cooling, heating, and power (CCHP) microgrid model; performing on a computer a multi-objective optimization to improve system efficiency of energy utilization and reduce environmental problems caused by animal wastes; and displaying results of the optimization for review.

Implementations of the above aspect can include one or more of the following. The optimization method incorporates an explicit daily operating cost minimization criterion applied to the microgrid infrastructure as well as daily energy output maximization from DERs. The system balances trade-off relationship between daily operating cost minimization and daily DERs energy output maximization. The system provides optimal management of a rural microgrid infrastructure based on multi-objective optimization. This objective is achieved through the creation of a comprehensive CCHP rural microgrid model. The whole microgrid system is grid-connected and the CCHP part is dependent on the electrical part. The whole system model is mathematically programmed into the platform of GAMS. But it can be done in any platform using any programming language and an algebraic equation solver Advantages of the system may include one or more of the following. The system helps but not limited to electrification of rural and remote areas. The system reduces environmental from large livestock farms such as dairy farms through proper treatment of animal wastes. The system enhances electrical system in farms vis-a-vis efficient waste management.

DESCRIPTION

Figure 1:
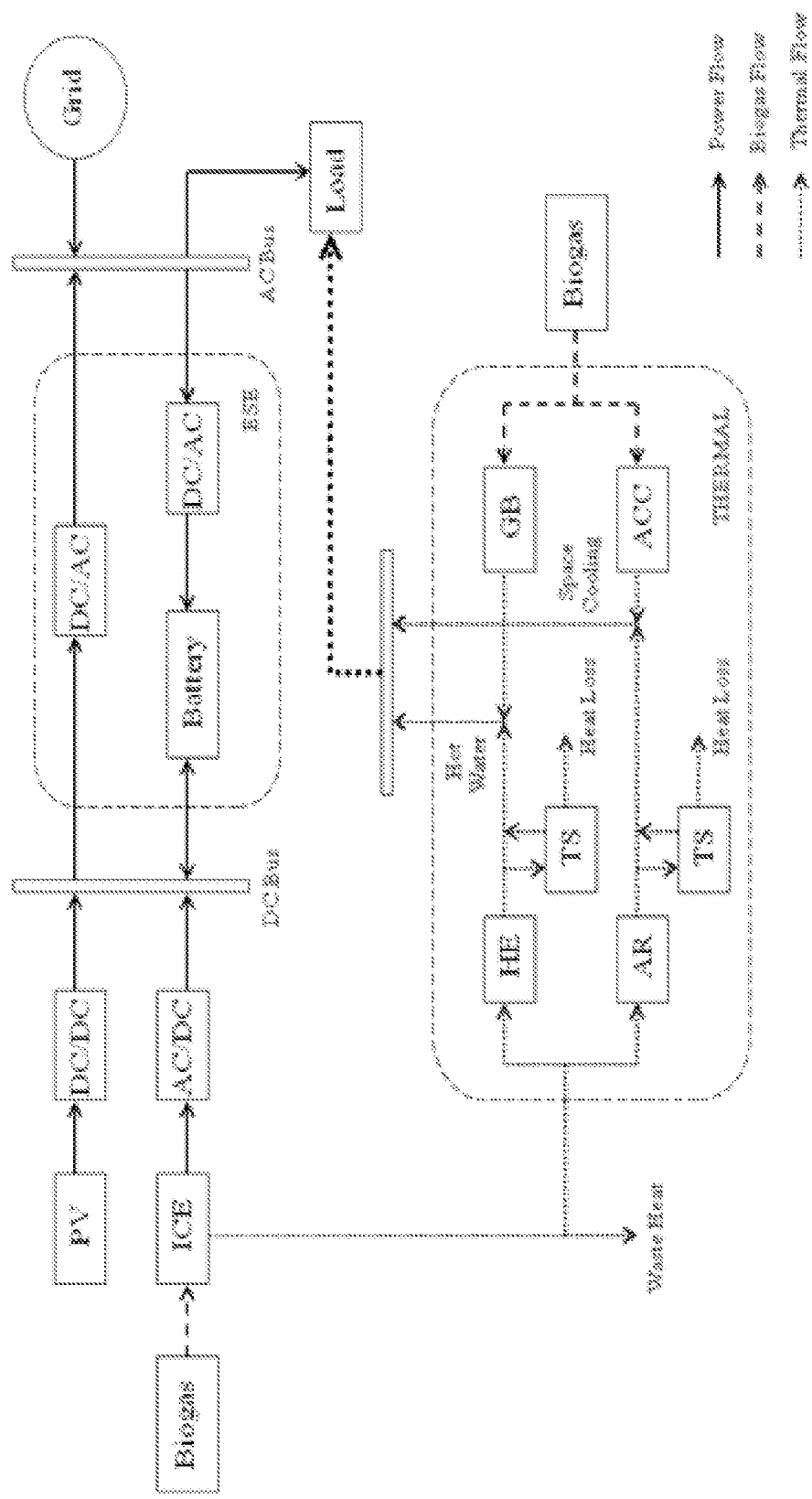
FIG. 1 shows an exemplary microgrid system.

FIG. 1 shows an exemplary microgrid system. The produced biogas is used to fire ICEs, gas boiler, as well as absorption chiller for cooling. The whole system can be divided into two parts: electrical part and thermal part. In electrical part, PV and ICEs are used as DERs to provide electricity for the whole system, the output of which are converted into direct current flowing into the DC bus. The gird will provide additional electricity to the whole system during periods of insufficient electricity inside the system. The grid can also be automatically selected to directly supply the load when emergencies occur in PV and ICEs. The energy storage ensemble (ESE) located between DC bus and AC bus is used to balance power supply and load demand between DERs, grid, battery, and the load. The model of the electrical part can be either operated in islanded mode or in grid-connected mode depending on the load condition.

In thermal part, part of the jacket water and exhaust heat from ICEs are utilized by heat exchanger (HE) and absorption refrigerator (AR) to provide the hot water and the cooling supply, respectively. The hot water tank is used to store the generated hot water and release it when there is an insufficiency of hot water supply. In case of capacity limit on heat exchanger, one gas boiler (GB) is added to provide enough hot water supply together with heat exchanger and hot water tank. Similarly, the thermal storage (TS) is used to store cold water generated from absorption refrigerator and release it when necessary. One absorption chiller for cooling (ACC) is also added in case of the capacity limit on absorption refrigerator, to provide enough cooling supply together with absorption refrigerator and thermal storage.

Figure 2:
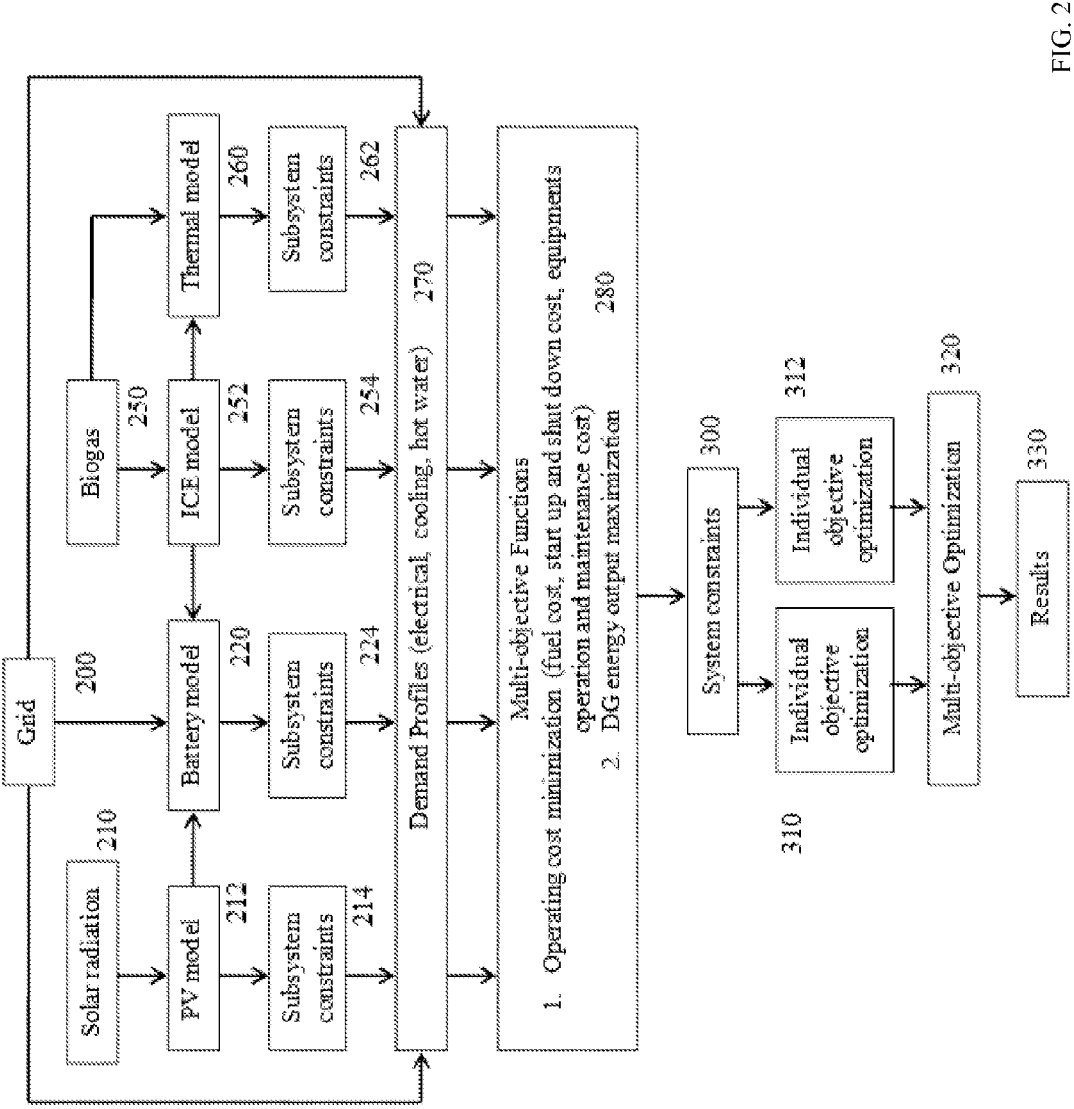
FIG. 2 shows an exemplary flow chart of a microgrid optimization model.

FIG. 2 shows an exemplary flow chart of a microgrid optimization model. A model of a grid 200 includes models for solar radiation 210, photovoltaic (PV) model 212, and PV constraints 214. Similarly, a battery model 200 and battery constraints 224 are captured. The model also includes biogas 250 with an internal combustion engine (ICE) model 252 and constraints 254. The ICE model 252 communicates with a thermal model 260 and thermal constraint 262

The model components 210-262 are provided to demand profiles 270 such as electrical, cooling, hot water profiles, among others. The information is provided to a multi-objective function optimizer 280. The optimizer 280 minimizes operating costs while maximizing energy output. This is subject to system constraints 300. The system can perform individual objective minimization 310-312, and then performs a multi-objective optimization 320 to generate results 330.

A combined cooling, heating, and power (CCHP) microgrid model can be used to improve system efficiency of energy utilization and lessen environmental problems caused by animal wastes based on multi-objective optimization. In this proposed model, the animal manure is used to produce biogas, which is used to feed internal combustion engines (ICEs), gas boilers, and absorption chillers. The generated electricity would offset that would otherwise be bought from main grids. PV generation is introduced to further increase the renewable fraction of energy contents. The electrical storage is also included to balance power demand and power supply. To increase system efficiency of energy utilization, coolant water from ICEs, plus their exhaust, could be utilized based on the thermal storage modeled, by inclusion of absorption refrigerator and heat exchanger. The final goal is to maximize energy output from distributed energy resources (DERs) and meanwhile minimize daily system operating cost. Extra electricity generated beyond the load demand could be used to charge battery storage. In this way, system energy cost is reduced with energy system improvement and reconfiguration, and surrounding environmental problems due to animal wastes are also lessened.

In one implementation, a rural dairy farm was selected as the test bed. The microgrid system infrastructure was introduced first. Then, the modeling of individual main component concerned of the microgrid system is done. Next, the multi-objective optimization method is deployed as describe in details below.

First, a biogas-fired ICE model is detailed. The fuel consumption rate of biogas-fueled ICE is expressed as a quadratic function of real power:

$$F_{g,t}=a_g+b_g P_{g,t}+c_g P_{g,t}^2 \qquad (1)$$

where $P_{g,t}$ is the generator g output in kW at time t, $a_g$, $b_g$, $c_g$ are coefficients that can be calculated, respectively, from the data sheet provided by the manufacturer.

The total fuel consumption rate $F_t$ is shown as follows:

$$F_t = \sum_{g=1}^{M} (a_g + b_g P_{g,t} + c_g P_{g,t}^2) \qquad (2)$$

The ICE units are first constrained by their capacities:

$$P_g^- u_{g,t} < P_{g,t} < P_g^+ u_{g,t}, \forall g \in M \qquad (3)$$

where $P_g^{+,-}$ are the generator capacity's lower bound and upper bound, $u_{g,t}$ is binary variable indicating the state of generator g in time t (0 is off and 1 is on), M is the total number of generators.

The ICE units are constrained by minimum up and down time constraints:

$$u_{g,s} \geq u_{g,t}-u_{g,t-1}, \forall g, s \in \{t+1,\ldots t+UT_g-1\} \qquad (4)$$

$$1-u_{g,s} \geq u_{g,t-1}-u_{g,t}, \forall g, s \in \{t+1,\ldots t+DT_g-1\} \qquad (5)$$

where s is the time period, $UT_g$ is the minimum up time of generator g in hours, $DT_g$ is the minimum down time of generator g in hours.

Ramp rate constraints are also considered for ICE units, which can restrict generators' output between two consecutive periods due to their physical limitations, also including start up and shut down periods:

$$P_{g,t}-P_{g,t-1} \leq R_g^+ u_{g,t-1}+R_g^{SU}(1-u_{g,t-1}), \forall g,t \qquad (6)$$

$$P_{g,t-1}-P_{g,t} \leq R_g^- u_{g,t}+R_g^{SD}(1-u_{g,t}), \forall g,t \qquad (7)$$

where $R_g^{+,-}$ are ramp up and ramp down constraints in kW when generator g is on, $R_g^{SU,SD}$ are start up and shut down constraints in kW when generator g starts up and shuts down.

Two other binary variables are used to represent start up and shut down states of ICEs, as shown in the following two equation:

$$v_{g,t}=u_{g,t}-u_{g,t-1}, \forall g,t \qquad (8)$$

$$w_{g,t}=u_{g,t-1}-u_{g,t}, \forall g,t \qquad (9)$$

where $v_{g,t}$ and $w_{g,t}$ are binary variables indicating start up and shut down state of ICEs.

Next, a PV model is detailed. The calculation of DC output power of PV modules $P_{PV,t}$ is shown as the following equation:

$$P_{PV,t}=\eta_{PV,t} A_{PV} G_{\beta,t} \qquad (10)$$

The PV efficiency $\eta_{PV,t}$ in time t is shown in [22]:

$$\eta_{PV,t}=\eta_r \eta_{pc}(1-\beta(T_{c,t}-T_{ref})) \qquad (11)$$

The PV cell temperature $T_c$ in °C. in time t is given by [23]:

$$T_{c,t} = T_a + \left(\frac{NOCT-20}{800}\right) G_{\beta,t} \qquad (12)$$

where $A_{PV}$ is the available total PV modules area in m², $G_{\beta,t}$ is incident solar radiation in Wh/m² in time t, $\eta_r$ is PV reference module efficiency, $\eta_{pc}$ is PV power conditioning efficiency, $\beta$ is PV efficiency temperature coefficient, $T_{ref}$ is PV reference temperature in °C., $T_a$ is PV ambient temperature, NOCT is normal operating cell temperature in °C.

A battery storage model is discussed next. The output power from DERs may be insufficient to supply the load; DERs and the main grid may fail to supply the load; and the supply from DERs may also exceed beyond the load demand. In these cases, the electrical battery storage is needed to balance the load demand and power supply, and store extra energy from DERs.

The hourly available capacity of the battery storage $P_{batt,t}$ in time t is calculated as the following:

$$P_{batt,t} = P_{batt,t-1} + E_{cha,t}\eta_{cha} - \frac{E_{dis,t}}{\eta_{dis}} \qquad (13)$$

where $E_{cha,t}$ is hourly charging quantity flows into the battery storage in kWh in time t, $E_{dis,t}$ is hourly discharging quantity flows out of the battery storage in kWh in time t, $\eta_{cha}$ is charging efficiency of the battery storage, $\Theta_{dis}$ is the discharging efficiency of the battery storage.

$$\sum_{g=1}^{M} P_{g,t} + P_{PV,t} + P_{grid,t} = P_{L,t} + E_{cha,t} - E_{dis,t} \qquad (14)$$

where $P_{grid,t}$ the hourly energy from the main grid in kWh in time t, $P_{L,t}$ is the load demand in kW in time t.

$$\Delta P_t = E_{cha,t} - E_{dis,t} \qquad (15)$$

The hourly charging or discharging quantity of the battery storage is constrained by the capacity of the battery storage $E_s$.

$$0 \leq E_{cha,t} \leq E_s \qquad (16)$$

$$0 \leq E_{dis,t} \leq E_s \qquad (17)$$

where $\Delta P_t$ is a free variable in kW, indicating the hourly charging or discharging quantity of the battery storage.

In any hour t, the battery storage is either in charging state ($E_{cha,t} \neq 0$, $E_{dis,t} = 0$) or in discharging state ($E_{cha,t} = 0$, $E_{dis,t} \neq 0$) or doesn't work ($E_{cha,t} = 0$, $E_{dis,t} = 0$).

$$E_{cha,t} \times E_{dis,t} = 0 \qquad (18)$$

The charged quantity of the battery storage is subject to the following constraints:

$$SOC^{-} \times E_s \leq P_{batt,t} \leq SOC^{+} \times E_s \qquad (19)$$

where $SOC^{+,-}$ are the upper bound and the lower bound of state of charge for the battery storage.

CCHP Model

The water based thermal storage tank is used to provide space cooling while the hot water tank is used to provide the daily hot water consumption. The model of the thermal storage tank for cooling is shown as the following equation [13]:

$$Q_t^{out} - Q_t^{in} = C\rho V(T(t+1) - T(t))/\Delta t - \epsilon C\rho V \Delta T \qquad (20)$$

While for the hot water tank model, the two terms in the left-hand side of the above equation are reversed. In the above equation, $Q_t^{out}$ is the heat release in kWh, $Q_t^{in}$ is the heat storage in kWh, C is the specific heat coefficient of storage medium in kWh/kg-K, $\rho$ is the density of storage medium in kg/m$^3$, V is the capacity of storage tank in m$^3$, T is the average temperature in the tank in K, $\Delta t$ is the hourly time duration, $\epsilon$ is the coefficient of waste heat from storage tank, and $\Delta T$ is the temperature range in the tank.

The constraints of thermal storage for space cooling and hot water tank are described by following equations:

$$Q_t^{cool} = COP_{AR} Q_{ICE1,t} + Q_{ACC,t} + Q_{hr1,t} \qquad (21)$$
$$= Q_{AR,t} + Q_{ACC,t} + Q_{hr1,t}$$

$$Q_t^{colin} \leq Q_{AR,t} \qquad (22)$$

$$Q_t^{colout} = Q_{hr1,t} \qquad (23)$$

$$Q_t^{colout} \times Q_t^{colin} = 0 \qquad (24)$$

$$Q_t^{hw} = COP_{HE} Q_{ICE2,t} + Q_{GB,t} + Q_{hr2,t} \qquad (25)$$
$$= Q_{HE,t} + Q_{GB,t} + Q_{hr2,t}$$

$$Q_t^{hwin} \leq Q_{HE,t} \qquad (26)$$

$$Q_t^{hwout} = Q_{hr2,t} \qquad (27)$$

$$Q_t^{hwout} \times Q_t^{hwcolin} = 0 \qquad (28)$$

$$Q_t^{hr} = \sum_{n=1}^{2} Q_n^{ICE} \qquad (29)$$

$$Q_t^{wh} = Q_{ICE3,t} \qquad (30)$$

$Q_t^{cool,hw}$ are space cooling demand and hot water demand in kW, $COP_{AR,HE}$ are the coefficient of performance for absorption refrigerator and heat exchanger, $Q_{ICE1,2,3}$ are heat recovered from ICEs for space cooling, hot water and waste heat not recovered in kW, $Q_{ACC,GB}$ are output from absorption chiller for cooling and gas boiler in kW, $Q_{AR,HE}$ are output from absorption refrigerator and heat exchanger in kW, $Q_{hr1,2}$ are heat released from thermal storage and hot water tank in kW, $Q_t^{wh}$ is the waste heat not recovered in kW, $Q_t^{colin,out}$ are heat recovered from ICEs flowing into and that flowing out of thermal storage in kW, $Q_t^{hwin,out}$ are heat recovered from ICEs flowing into and that flowing out of hot water tank in kW.

The system optimizes two objective functions in one embodiment:

A. Minimization of Operating Cost

The objective function of system operating cost (OC) in $, including biogas fuel cost (FC), ICEs start up and shut down cost (SSC), equipments operation and maintenance cost (OMC), and cost of electricity bought from the grid (EBC), are shown as the followings:

$$OC = FC + SSC + OMC + EBC \qquad (31)$$

$$FC = \sum_{t=1}^{N} \Delta T(F_t + F_{GB,t} + F_{ACC,t}) C_{Bio} \qquad (32)$$

$$SSC = \sum_{t=1}^{N} \sum_{g=1}^{M} (v_{g,t} SU + w_{g,t} SD) \qquad (33)$$

$$OMC = \sum_{t=1}^{N} \Delta T \left( OM_{ICE} \sum_{g=1}^{M} P_{g,t} + OM_{GB} P_{GB,t} + OM_{ACC} P_{ACC,t} + OM_{AR} P_{AR,t} \right) \qquad (34)$$

$$EBC = \sum_{t=1}^{N} \Delta T(C_{GriE} P_{grid,t}) \qquad (35)$$

where $\Delta T$ is hourly time step, $C_{Bio}$ is the biogas cost in $/L, $F_{t,GB,ACC}$ are fuel cost of ICEs, gas boiler, and absorption chiller for cooling in L/h, SU, SD are start up cost and shut down cost in $, $OM_{ICE,GB,ACC,AR}$ are operation and maintenance cost of ICEs, GB, ACC, and AR in $/kWh, $P_{GB,ACC,AR,t}$ are output of gas boiler, absorption chiller for cooling and absorption refrigerator in time t in kW, $C_{GriE}$ is electricity cost of the grid in $/kWh, $P_{grid,t}$ is the power bought from the grid in kW.

B. Maximization of DG Output

The objective function of the total DG output $E_{DG}$ in kWh is given by the following equation:

$$E_{DG} = \sum_{t=1}^{N} \left( \sum_{g=1}^{M} P_g(t) + P_{PV}(t) \right) \Delta T \quad (36)$$

C. System Constraints $$\sum_{g=1}^{M} P_{g,t} + P_{PV,t} + P_{grid,t} - P_{L,t} = \Delta P_t \quad (37)$$

In one embodiment, a multi-objective optimization can be used to manage and find the best solution between different objectives. Since these objectives might be nonlinear, conflicting or incommensurable, the global optimal solution for the multi-objective optimization is generally achieved by Pareto optimality. The Pareto optimal solutions are best compromise or trade-off solutions between different objectives. A trade-off frontier between the objective of system operating cost minimization and the objective of DG output maximization would be found according to the preferences of the decision makers. However, the development of Pareto optimal solutions is significantly complicated when the number of objectives exceeds two, where normal boundary interaction (NBI) and $\epsilon$-constraint method are efficient algorithms to solve such problems. The whole system model is programmed and optimized in GAMS environment. Since it is mixed integer nonlinear programming, the BONMIN solver is selected to solve the optimization problem.

Based on MINLP, a CCHP model of a rural microgrid uses multi-objective optimization to improve system efficiency of energy utilization, reduce the daily operating cost, and lessen environmental problems caused by animal wastes. A variety of energy sources, such as ICEs, PV modules, battery, thermal storage, absorption refrigerator, absorption chiller, gas boiler, heat and exchanger are included in the microgrid model. Constraint functions are included in the optimization model to reflect some detailed as well as necessary considerations and thus make the results more accurate and close to reality. From the results, the multi-objective optimization on daily operating cost minimization and DG energy output maximization works very well based on the microgrid model presented, which can give optimal solutions to both the daily operating cost and the DG energy output.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 3:
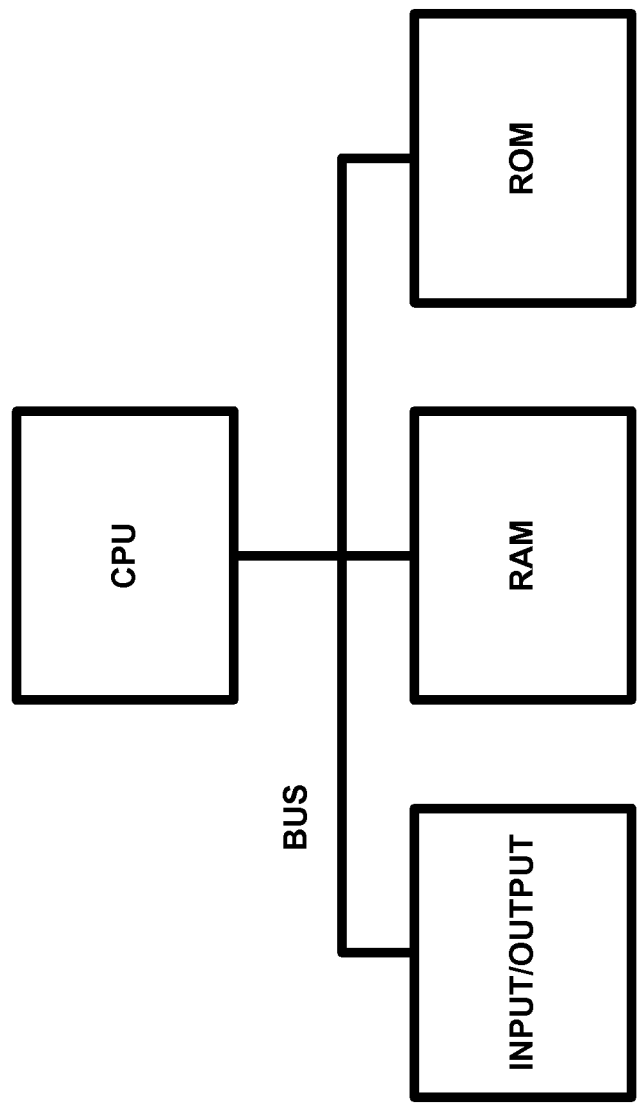
FIG. 3 shows an exemplary computer system to improve energy efficiency of a farm with livestock wastes.

By way of example, a block diagram of a computer to support the system is discussed next in FIG. 3. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The system has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer implemented method to improve energy efficiency of a farm with livestock wastes with a microgrid, comprising:
   generating a comprehensive cooling, heating, and power (CCHP) microgrid model with biogas produced from livestock waste;
   performing on a computer a multi-objective optimization to improve system efficiency of energy utilization and reduce environmental problems caused by animal wastes;
   displaying results of the multi-objective optimization for review; and
   modeling a thermal storage tank for cooling as:

$$Q_t^{out} - Q_t^{in} = C\rho V(T(t+1) - T(t))/\Delta t - \epsilon C\rho V \Delta T$$

where $Q_t^{out}$ is the heat release in kWh, $Q_t^{in}$ is the heat storage in kWh, C is the specific heat coefficient of storage medium in kWh/kg-K, $\rho$ is the density of storage medium in kg/m$^3$, V is the capacity of storage tank in m$^3$, T is the average temperature in the tank in K, $\Delta t$ is the hourly time duration, $\epsilon$ is the coefficient of waste heat from storage tank, and $\Delta T$ is the temperature range in the tank:
   wherein produced biogas used to fire a gas boiler for the heating and can be used for firing an absorption chiller for the cooling;
   wherein the above steps are carried out by a computer having a processor and memory.

2. The computer implemented method of claim 1, comprising modeling electrical energy generation and a thermal energy generation.

3. The computer implemented method of claim 1, comprising modeling fuel consumption rate of biogas-fueled internal combustion engine (ICE) as real power $$F_{g,t} = a_g + b_g P_{g,t} + c_g P_{g,t}^2$$

where $P_{g,t}$ is the generator g output in kW at time t, and $a_g$, $b_g$, $c_g$ are coefficients from the ICE.

4. The computer implemented method of claim 1, comprising modeling hourly available capacity of battery storage $P_{batt,t}$ in time t as $$P_{batt,t} = P_{batt,t-1} + E_{cha,t}\eta_{cha} - \frac{E_{dis,t}}{\eta_{dis}}$$

where $E_{cha,t}$ is hourly charging quantity flows into the battery storage in kWh in time t,
$E_{dis,t}$, is hourly discharging quantity flows out of the battery storage in kWh in time t, $\eta_{cha}$ is charging efficiency of the battery storage, $\eta_{dis}$ is the discharging efficiency of the battery storage.

5. The computer implemented method of claim 1 comprising modeling system constraints as:

$$\sum_{g=1}^{M} P_{g,t} + P_{PV,t} + P_{grid,t} - P_{L,t} = \Delta P_t$$

where M is the number of generators g, $P_{g,t}$ is the generator g output in kW at time t, $P_{pv,t}$ is DC output power of photovoltaic module at time t, where $P_{grid,t}$ is the energy from the main grid in kWh in time t, and $P_{L,t}$ is the load demand in kW in time t.

6. The computer implemented method of claim 5, comprising solving the optimization problem with a mixed-integer non linear solver.

7. The computer implemented method of claim 1, comprising incorporating an explicit periodic operating cost minimization criterion applied to the microgrid infrastructure and maximization of energy output from distributed energy resources (DERs).

8. The computer implemented method of claim 1, comprising balancing trade-offs between daily operating cost minimization and periodic maximization of energy output from distributed energy resources (DERs).

9. The computer implemented method of claim 1, comprising providing optimal management of a rural microgrid infrastructure based on multi-objective optimization including economic cost of waste management.

10. The computer implemented method of claim 1, comprising modeling thermal components of the microgrid optimization model with models for cooling demand and hot water demand.

11. The computer implemented method of claim 1, comprising optimizing individual objective function separately.

12. The computer implemented method of claim 1, comprising using individual objective optimization results as extreme points of a trade-off curve and creating a pareto front for operation management.

13. The computer implemented method of claim 1, comprising performing the muti-objective optimization with the CCHP model for a multi-criteria rural microgrid system based on mixed integer non-linear programming.

14. The computer implemented method of claim 1, comprising modeling cooling demand with a combined model of absorption refrigerator, absorption chiller, and heat release from a thermal storage.

15. The computer implemented method of claim 1, comprising modeling of emissions and cost of energy, heat and power, for a local distribution system or microgrid.

16. The computer implemented method of claim 1, comprising modeling of AC and DC power distribution with energy storage, thermal and electrical, for onsite demand management in a local distribution system or microgrid.

17. The computer implemented method of claim 1, comprising modeling of grid-tied or islanded microgrids for revenue maximization and emission minimization using managed sale of energy and reduction of operating cost while providing for local thermal and electrical demand.

* * * * *